United States Patent [19]

Hladik

[11] 4,199,387
[45] Apr. 22, 1980

[54] AIR FILTER FABRICATION METHOD

[75] Inventor: Stephen M. Hladik, Liverpool, N.Y.

[73] Assignee: Cambridge Filter Corporation, Syracuse, N.Y.

[21] Appl. No.: 856,673

[22] Filed: Dec. 2, 1977

[51] Int. Cl.² .................... B31F 1/00; B01D 25/02
[52] U.S. Cl. ............................ 156/160; 156/213; 156/227; 156/325; 55/497; 55/DIG. 5
[58] Field of Search ............... 156/227, 226, 160, 161, 156/212, 213, 325; 55/497, 500, 502, DIG. 5

[56] References Cited

U.S. PATENT DOCUMENTS

| 2,720,937 | 10/1955 | Root, Jr. | 55/500 |
| 2,884,091 | 4/1959 | Baldwin | 55/500 |
| 3,581,479 | 6/1971 | Goulet et al. | 55/500 |

FOREIGN PATENT DOCUMENTS 781194  8/1957  United Kingdom ............ 55/497

Primary Examiner—John T. Goolkasian
Assistant Examiner—William H. Thrower
Attorney, Agent, or Firm—Charles S. McGuire

[57] ABSTRACT

An air filter unit of the pleated media, high efficiency type wherein the media pleat edges are sealed to the supporting frame to prevent bypass of air with a ceramic adhesive and fibrous ceramic mat which allows the unit to be exposed to high temperatures (e.g., up to 2000° F.) without danger of seal breakdown. While in the form of a slurry the adhesive is applied, for example, with a trowel to the zig-zag pleated edges of the media which, together with corrugated spacers, forms the filter core. The latter is then surrounded on four sides by the compressible mat of fibrous ceramic material and inserted in a box-like support frame with the slurry filling the space between the pleated edges of the media and the fibrous mat. The filter core and surrounding mat are assembled with the support frame while the slurry is still wet whereby, upon hardening, the resulting layers of ceramic cement provide a complete, heat-resistant seal while avoiding cracking in normal handling due to the resilience of the compressed fibrous mat which maintains an airtight seal between hardened ceramic and support frame.

5 Claims, 3 Drawing Figures

AIR FILTER FABRICATION METHOD

BACKGROUND OF THE INVENTION

The present invention relates to high efficiency air filters and, more specifically, to attachment of filter media to a support frame for use in high temperature application.

Air filters of the so-called "absolute" type are required to operate with a minimum 99.97% efficiency in filtering the air passing therethrough. In a popular construction of such filters, a continuous sheet of filter media is folded in zig-zag fashion to form a plurality of accordian pleats of uniform size and corrugated, thin corrugated sheets are placed between the opposing walls of each pleat on both the upstream and downstream sides to insure that the entire media surface is available for passage of air. The filter core, comprising the pleated media and spacers, is supported by a surrounding, box-like frame with which the media is sealingly engaged about its entire periphery, including both ends and the entire lengths of both pleat edges.

In some applications, filters of this type are installed in locations where they are subject to high temperatures, e.g., on the order of 1000° F. One method of sealing the media to the frame involves the use of resin adhesives which are initially applied in liquid form and harden to form the necessary seal between the media and frame such as disclosed, for example, in U.S. Pat. No. 3,581,479 of Roger T. Goulet, issued June 1, 1971, and in application Ser. No. 856,674 of Stanley J. Wasielewski, filed of even date herewith, both assigned to applicant's assignee. However, such adhesives will not normally withstand temperatures as high as that mentioned above without destroying the effectiveness of the seal, thus requiring replacement of the filter unit. Therefore, other sealing means which remain effective during and after exposure to high temperatures, must be used in such applications but are difficult to provide.

One of the most successful structures providing the required sealing between the filter core and frame which is capable of withstanding high temperatures is that disclosed in U.S. Pat. No. 2,884,091. In such filter constructions a mat or blanket of fine glass fibers is compressed between the filter core and the surrounding metal frame. All components of the filter unit may be exposed to high temperature without danger of deterioration and the uniform compression of the glass fiber mat about the filter core provides a most effective seal, preventing bypass of unfiltered air around the filter media. However, at elevated temperatures the glass fibers begin to anneal causing the fibrous mat to loose resiliency resulting in leakage between core and frame. It is thus apparent that, although the sealing means itself may be efficient for the intended purpose, at extremely or even at moderately high temperatures approaching 1000° F. filtering efficiency may be seriously reduced.

Accordingly, it is a principal object of the present invention to provide a method of fabricating a high-efficiency air filter unit wherein the sealing means which prevents bypass of the filter media is fully effective and retains its efficiency at high temperatures.

A further object is to provide an air filter fabrication method utilizing a ceramic adhesive and a ceramic fibrous mat to seal the core to the frame and, although the expansion coefficients vary between ceramic sealed core and frame, the fibrous mat maintains a seal between elements.

Other objects will in part be obvious and will in part appear hereinafter.

SUMMARY OF THE INVENTION

In accordance with the foregoing objects, the invention contemplates an air filter assembly of the type having a core of pleated media with corrugated spacers between the walls of each pleat and a box-like frame supporting the media and sealed with respect thereto about the entire periphery in air-tight engagement. In fabrication, the media is pleated and the spacers inserted in conventional fashion to form the filter core. A slurry formed from a ceramic powder filler and liquid binder is applied to each of the two zig-zag pleat edges with a trowel in a thick, viscous layer.

While the slurry is still wet, the core is surrounded by a mat or blanket of fibrous ceramic material and inserted in a concentric, box-like frame with the layer of fibrous material firmly compacted and completely filling the space between the core and frame. By the time the slurry has hardened to its cured state the filter core has been mounted within the frame with the intermediate layer of fibrous ceramic material providing a seal with a high degree of resilience, whereby the impact transmitted to the frame during normal handling will not crack or otherwise damage the layer of ceramic adhesive.

DETAILED DESCRIPTION

Figure 1:
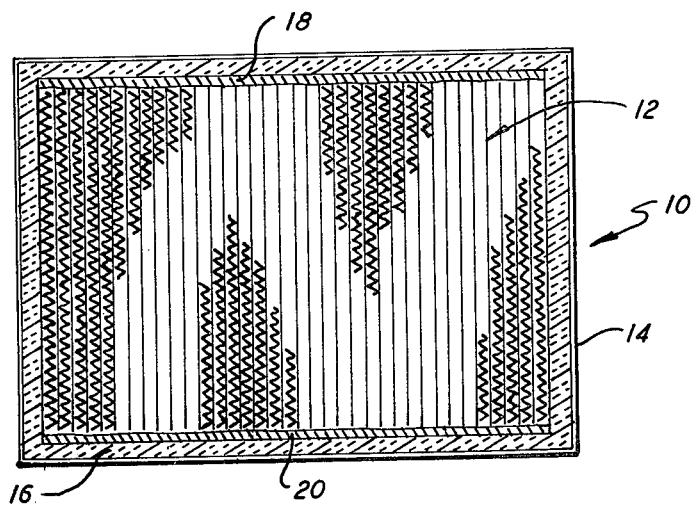
FIG. 1 is a front elevational view of an air filter unit fabricated according to the method of the present invention.
Figure 2:
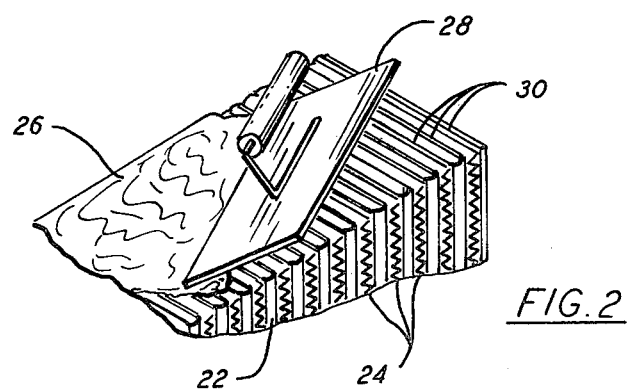

Referring now to the drawing, in FIG. 1 is shown an air filter unit, designated generally by reference numeral 10, comprising filter core 12, four-sided support frame 14, compressed blanket 16 of fibrous ceramic material, and ceramic cement layers 18 and 20. Filter core 12 is entirely conventional being formed from a continuous strip of filter media 22 folded at equal intervals in zig-zag fashion to provide a desired number of accordian-type pleats, as best seen in FIG. 2. Between the opposing walls of each pleat is placed a sheet of thin, corrugated material, forming spacers 24 which hold the walls of the pleats apart and insure that essentially the total media area is available for passage therethrough of the air from the inlet to the outlet side of filter unit 10. This construction is in accordance with Root U.S. Pat. No. 2,720,937, issued Oct. 18, 1955, to which reference may be had for a more detailed description.

Upon completion of assembly of filter core 12, a coating of ceramic slurry mix 26 is applied with trowel 28, as indicated in FIG. 2, or by other convenient means, to cover entirely the two ends of core 12 formed by the zig-zag edges 30 of media 22 and interposed edges of spaces 24. Slurry mix 26 is made in conventional fashion by mixing a powder filler and liquid binder in the proper proportions. The ingredients for slurry mix 26 may be, for example, those available from Sauereisen Cements Co., of Pittsburgh, Pa., and sold under the trade designation Sauereisen No. 31 acid-proof cement.

Figure 3:
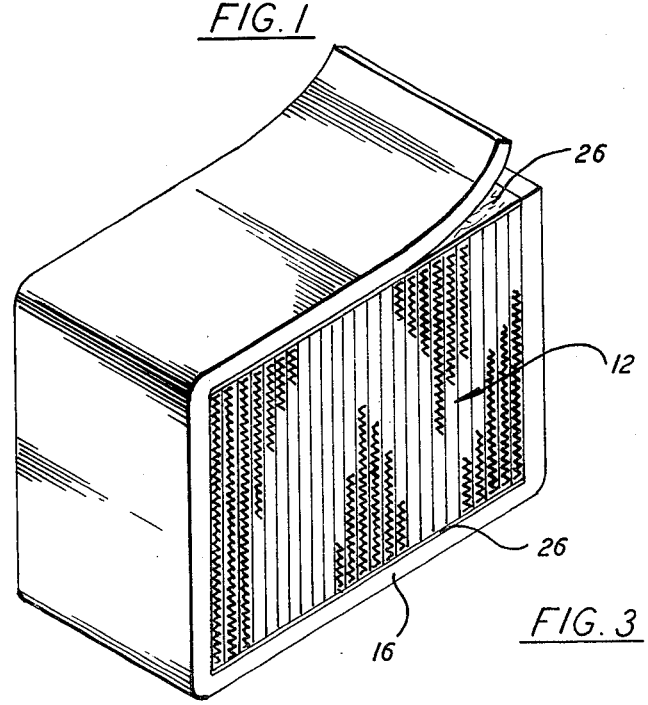
FIGS. 2 and 3 are perspective views illustrating steps in the fabrication of the unit of FIG. 1.

As soon as the two opposite ends of core 12 formed by the zig-zag edges of media 22 are covered with layers of slurry mix 26, as indicated in FIG. 2 filter core 12 is wrapped on four sides with mat or blanket 16 of fibrous ceramic material. The material of blanket 16 is preferably a rather dense, but somewhat resilient layer of ceramic fibers of the type commercially available from Babcock and Wilcox Co. under the trade name Kaowool. After wrapping core 12 with blanket 16 in the manner illustrated in FIG. 3, frame 14 is assembled about the four sides covered by blanket 16, completing the filter unit in the form shown in FIG. 1.

Frame 14 is formed of sheet metal and the construction and assembly may be identical to that disclosed in U.S. Pat. No. 2,884,091. Therefore, further description, illustration or discussion are unnecessary in the present application. Relative dimensions of core 12 and frame 14 are such that, after final assembly, blanket 16 is compressed on all four sides to a thickness about one-half of its original thickness to form a compressed, fibrous, ceramic mat providing an airtight seal between the filter frame and core. Slurry mix 26 chemically sets in 30 to 40 minutes to form hard, temperature stable, ceramic adhesive layers 18 and 20. Since blanket 16 and frame 14 are assembled with core 12 while slurry mix 26 is still wet, with curing taking place after assembly, cracks in the ceramic layers due to normal handling of the coated core after ceramic cure are avoided. Ceramic layers 18 and 20 thus provide a heat-resistant, inorganic adhesive which effectively fills and seals any nicks or flaws in the zig-zag edges of the media while compressed fibrous layer 16 provides a somewhat resilient, impact absorbing layer between frame 16 and the ceramic layers while effectively preventing air bypass at extreme temperatures. Since the outer walls of the media at each end of core 12 are in contact over essentially their entire surface with compressed fibrous layer 16, the seal thus formed is entirely effective and there is no requirement for ceramic layers on the sides.

What is claimed is:

1. A method of fabricating a high-efficiency air filter unit suitable for high temperature applications comprising:
   (a) forming a filter core by folding a continuous sheet of filter media at evenly spaced intervals in accordian fashion, thereby providing a plurality of side-by-side pleats;
   (b) covering each of the two sides of said filter core formed by zig-zag edges of said media with a layer of ceramic adhesive in the form of a spreadable slurry mix which later hardens to form a ceramic cement layer;
   (c) wrapping said filter core on four sides including the two-slurry-covered sides with a compressible blanket of fibrous ceramic material while said slurry is in a wet and flowable condition; and
   (d) mounting said core and blanket within a rigid, four-sided, boxlike support frame of such dimensions relative to said core and blanket that the latter is compressed between said frame and core to a fraction of its uncompressed thickness.

2. The invention according to claim 1 wherein said mounting step is performed while said slurry is wet and flowable.

3. The invention according to claim 2 and further including the step of placing a spacer member between opposing walls of each of said pleats prior to applying said ceramic adhesive.

4. The invention according to claim 3 wherein said slurry mix is applied manually with a trowel.

5. The invention according to claim 3 wherein said spacer members are of a rectangular dimension approximately equal to that of said pleats, and said slurry mix is applied to the edges of said spacer members as well as to said zig-zag edges of said media.

* * * * *